D. O. THOMPSON & B. A. RICE.
Nut-Locks.

No. 135,864. Patented Feb. 11, 1873.

*Rubber*

Witness:
Franck L. Durand
C. L. Evert

Inventor.
David O. Thompson.
Benj. A. Rice.
per
Alexander Mason,
Attorneys.

UNITED STATES PATENT OFFICE.

DAVID O. THOMPSON AND BENJAMIN A. RICE, OF PONTIAC, MICHIGAN, ASSIGNORS OF ONE-THIRD OF THEIR RIGHT TO JEROME B. SWEETLAND, OF SAME PLACE.

IMPROVEMENT IN NUT-LOCKS.

Specification forming part of Letters Patent No. 135,864, dated February 11, 1873.

*To all whom it may concern:*

Be it known that we, DAVID O. THOMPSON and BENJAMIN A. RICE, of the city of Pontiac, in the county of Oakland and in the State of Michigan, have invented certain new and useful Improvements in Nuts for Bolts; and do hereby declare that the following is a full, clear, and exact description thereof, reference being had to the accompanying drawing and to the letters of reference marked thereon making a part of this specification.

The nature of our invention consists in the construction of a combination nut, designed to be used in every variety of work where it is desirable that the nut should remain exactly where it was placed.

In order to enable others skilled in the art to which our invention appertains to make and use the same, we will now proceed to describe its construction and operation, referring to the annexed drawing, in which—

Figure 1:
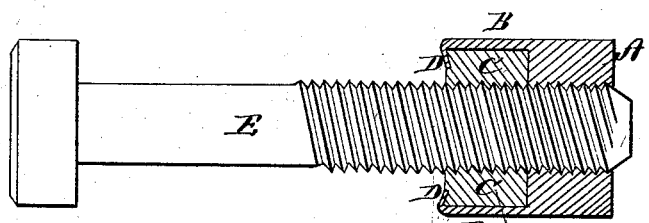
Figure 2:
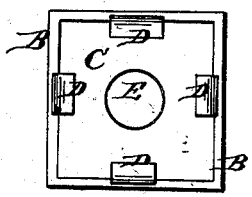

Figure 1 is a side view of the bolt with a section of the nut placed on the same, and Fig. 2 is an end view of the nut.

Our nut is formed of a hollow shell, A, made of malleable iron or other suitable metal, with a bottom of sufficient thickness to form the nut if it were made in the common way. The four sides of this nut A are then raised any desired height to form a chamber or receptacle, B, for receiving a piece, C, of rubber. This rubber piece C should be of sufficient length or thickness to get the desired amount of tension or jam on the bolt to prevent the nut from jarring loose. At the extreme outer end of the raised sides of the nut are narrow lips or spurs D, projecting a short distance, which are bent inward after the rubber C has been placed in the receptacle made to receive it, and thus prevents the rubber from coming out. E is the bolt, which screws both through the rubber C and nut A, the rubber jamming hard enough on the bolt to prevent the nut from jarring loose.

Having thus fully described our invention, what we claim as new, and desire to secure by Letters Patent, is—

The within-described nut-lock, consisting of the solid metal head A, with a central screw-recess and hollow chamber, B, rubber nut C, secured by the bent projections D, and the screw-bolt E, passing through the rubber and metal parts A C, all as set forth.

In testimony that we claim the foregoing we have hereunto set our hands this 25th day of November, 1872.

DAVID O. THOMPSON.
BENJAMIN A. RICE.

Witnesses:
JUNIUS TEN EYCK,
J. B. SWEETLAND.